United States Patent [19]

Sheehan et al.

[11] Patent Number: 5,570,430
[45] Date of Patent: Oct. 29, 1996

[54] METHOD FOR DETERMINING THE CONTOUR OF AN IN VIVO ORGAN USING MULTIPLE IMAGE FRAMES OF THE ORGAN

[75] Inventors: Florence H. Sheehan, Mercer Island; Robert M. Haralick; Chang-Kyu Lee, both of Seattle, all of Wash.

[73] Assignee: University of Washington, Seattle, Wash.

[21] Appl. No.: 251,733

[22] Filed: May 31, 1994

[51] Int. Cl.$^6$ .................................................. G06K 9/00
[52] U.S. Cl. ........................ 382/128; 382/131; 382/132; 382/266; 128/653.1; 128/659; 378/98.5; 364/413.13
[58] Field of Search ................................. 382/128, 131, 382/132, 172, 257, 266; 378/98.5; 128/653.1, 659; 364/413.07, 413.13

[56] References Cited

U.S. PATENT DOCUMENTS

| | | | |
|---|---|---|---|
| 4,295,473 | 10/1981 | Diamond et al. | 178/695 |
| 4,387,392 | 6/1983 | Grattoni et al. | 378/98.5 |
| 5,065,435 | 11/1991 | Oe | 382/128 |
| 5,239,591 | 8/1993 | Ranganath | 382/6 |
| 5,245,445 | 9/1993 | Fujisawa | 358/458 |
| 5,268,967 | 12/1993 | Jang et al. | 382/6 |
| 5,274,549 | 12/1993 | Almasi | 382/128 |
| 5,421,331 | 6/1995 | Devito et al. | 382/128 |
| 5,435,310 | 7/1995 | Sheehan et al. | 382/128 |
| 5,457,754 | 10/1995 | Han et al. | 382/128 |

OTHER PUBLICATIONS

J. G. Bosch et al., *Developments Towards Real–time Frame–to–Frame Automatic Contour Detection on Echocardiograms*, Thoraxcenter, Erasmus University, Rotterdam, and Delft University of Technology, The Netherlands, pp. 435–438.

J. S. Duncan et al., *Medical Image Analysis Using Model-Based Optimization*, 1990 IEEE, Departments of Electrical Engineering, Computer Science and Diagnostic Radiology, Yale University, New Haven, Connecticut, pp. 370–377.

R. M. Haralick et al., *Image Analysis Using Mathematical Morphology*, IEEE Transactions on Pattern Analysis, and Machine Intelligence, vol. PAMI–9, No. 4, Jul. 1987, pp. 532–550.

F. Meyer et al., *Morphological Segmentation*, Journal of Visual Communication and Image Representation, vol. 1, No. 1, Sep. 1990, pp. 21–46.

R. E. van Bree et al., *Improving Left Ventricular Border Recognition Using Probability Surfaces*, 1989 IEEE, University of Utah, LDS Hospital Department of Medical Informatics, pp. 121–124.

(List continued on next page.)

*Primary Examiner*—Jose L. Couso
*Assistant Examiner*—Anh Hong Do
*Attorney, Agent, or Firm*—Ronald M. Anderson

[57] ABSTRACT

A method for automatically evaluating image data taking over a sequence of image frames to determine a contour of a left ventricle (LV). The sequence of image frames are converted to digital data that identify a gray scale value for each pixel in each image frame. Using probability, an initial LV region is estimated based upon previously determined a priori parameters that are derived from processing manually drawn contours of the LV in other hearts, for the sequence of image frames being analyzed. The initial estimate of the LV region is refined using motion constraints, which are also derived from training data determined from the manually-drawn contours of other hearts. An LV region is estimated and its coordinates are extracted for use in applying global shape constraints that provide a more accurate LV boundary estimate for the region around an apex of the left ventricle. Finally, the estimated LV boundary estimate is tested for consistency, yielding an accepted estimate, or warning that the estimate is unreliable. The resulting automatically determined contours of each image frame can be displayed almost immediately after the image data are produced so that a physician can more readily diagnose physiological defects of the heart.

22 Claims, 13 Drawing Sheets

OTHER PUBLICATIONS

J. G. Bosch et al., *Automatic Frame-to-Frame Contour Detection in Echocardiograms Using Motion Estimation*, Laboratory for Clinical and Experimaental Image Processing, Dept. of Diagnostic Radiology, University Hospital, Leiden, The Netherlands, pp. 351–354.

P N J van der Zwet et al., *Left Ventricular Contour Detection: A Fully Automated Approach*, Laboratory for Clinical and Experimental Image Processing, Dept. of Diagnostic Radiology, University Hospital, Leiden, The Netherlands, pp. 359–362.

GROUND TRUTH CLASS

METHOD FOR DETERMINING THE CONTOUR OF AN IN VIVO ORGAN USING MULTIPLE IMAGE FRAMES OF THE ORGAN

FIELD OF THE INVENTION

The present invention generally pertains to a method for determining a boundary or contour of an internal organ based upon image data, and more specifically, is directed to a method for determining the contour of the organ based on processing image data for multiple image frames.

BACKGROUND OF THE INVENTION

Contrast ventriculography is a procedure that is routinely performed in clinical practice during cardiac catheterization. Catheters must be intravascularly inserted within the heart, for example, to measure cardiac volume and/or flow rate. Ventriculograms are X-ray images that graphically represent the inner (or endocardial) surface of the ventricular chamber. These images are typically used to determine tracings of the endocardial boundary at end diastole, when the heart is filled with blood, and at end systole, when the heart is at the end of a contraction during the cardiac cycle. By tracing the contour or boundary of the endocardial surface of the heart at these two extremes in the cardiac cycle, a physician can determine the size and function of the left ventricle and can diagnose certain abnormalities or defects in the heart.

To produce a ventriculogram, a radio opaque contrast fluid is injected into the left ventricle (LV) of a patient's heart. An X-ray source is aligned with the heart, producing a projected image representing, in silhouette, the endocardial surface of the heart (myocardium) muscle. The silhouette image of the LV is visible because of the contrast between the radio opaque fluid and other surrounding physiological structure. Manual delineation of the endocardial boundary is normally employed to determine the contour, but this procedure requires time and considerable training and experience to accomplish accurately. Alternatively, a medical practitioner can visually assess the ventriculogram image to estimate the endocardial contour, but such evaluation is often little better than an educated guess, particularly if the ventriculogram being assessed was made at or near end systole. Clearly, an automated border detection technique that can produce more accurate results, in much less time than the manual evaluation, would be preferred.

Several automatic border detection algorithms have been developed to address the above-noted problem. In U.S. Pat. No. 5,268,967, a number of different prior art methods are discussed for improving the definition with which images can be resolved to identify specific portions of the body. It is suggested by this reference that a histogram-based tone-scale transformation is a simple and effective way to adjust the contrast of an image, but that other techniques must be employed to distinguish the desired foreground portion of an image from the background clutter and to distinguish the object in question from the foreground and background. After discussing what others have done to achieve this goal and the problems with these techniques, the patent discloses a method that can be applied to any digital radiographic input image. The method disclosed in the patent includes the steps of edge detection, block generation, block classification, block refinement, and bit map generation. More specifically, after the edges of the object are detected in the first step, the image is broken into a set of nonoverlapping, contiguous blocks of pixels, which are classified into foreground, background, and object, on a block-by-block basis. The block classification step determines in which of ten possible states each block belongs, using a set of clinically and empirically determined decision rules. By evaluating the fine structure within each block, the block classification is refined, so that a two-valued or binary image is produced that functions as a template for any further image processing to be done on the image.

Another technique related to automated border detection is based upon identifying a gradient of the gray scale values comprising an image. In this prior art technique, a gray scale threshold gradient value is applied to process the gray scale image data of a ventriculogram in order to identify the boundary of the LV, and further processing may be employed to improve the accuracy with which the border is identified. Alternatively, it is suggested that landmarks or recognizable shapes or gray scale value combinations can be tracked over time to determine the direction and velocity of motion, which are represented as flow vectors. By analyzing the pattern of flow vectors, motion of the organ can be assessed. However, these flow vectors do not directly indicate the contour of the organ.

Yet another technique that is sometimes employed to determine the contour of an organ is based on digital subtraction. A mask image is recorded prior to introduction of a radio opaque contrast substance into the organ. This mask image may contain radio opaque structures such as ribs and vertebrae, which tend to interfere with discerning the contour of the organ. After the radio opaque contrast substance is introduced into the organ and a second image produced, the mask image is digitally subtracted from the second image, thereby removing the clutter in the second image that is not the organ in question. In practice, this technique is difficult to implement because registration between the mask image and the subsequent second image of the organ made perceptible by the radio opaque contrast substance is difficult to achieve. A variation of this technique employs time interval delay subtraction, wherein an image that was previously made close in time is subtracted from an image being analyzed, so that a difference image is produced that contains only the part of the organ that moved during the time interval between the two images. However, any part of the organ that does not move between the times that the two images were made cannot be delineated.

Morphological operators can also be employed to process image data in order to define boundaries of objects. Such techniques are often more general in application, e.g., relating to artificial vision systems, and are therefore not constrained by physiological considerations.

A paper entitled "Medical Image Analysis using Model-Based Optimization" by James S. Duncan, Lawrence H. Staib, Thomas Birkhölzer, Randall Owen, P. Anandan, and Isil Bosma (IEEE, 1990), suggests the use of mathematical models based on empirically determined data for analysis of didgnostic medical images. In the second example discussed in this paper, a parametric shape model with an image-derived measure of boundary strength is employed. Use of the empirical data for the model improves its accuracy, but the results are still somewhat arbitrary.

Most of the prior art dealing with the problem of boundary determination has focused on analysis of a single image. Even the best of the currently available automated algorithms for determining the contour of an organ such as the heart have a very low success rate and typically require human correction to avoid significant errors. One of the greatest problems with existing automated techniques is that they do not apply knowledge of the expected shape and motion of the specific chamber/organ being analyzed in the manner that a physician would if evaluating the image. To attain at least the accuracy of an expert analyzing the image, an automated method should employ as much information derived from the imaging as possible to delineate the surface of the organ. Further, the automated system should accomplish the task more efficiently and quickly than a human. Toward that end, it has become apparent that more information than can be obtained from a single image will improve the accuracy with which an automated technique can determine the contour of an organ. Analysis of more than one image can provide the additional information needed for an automated method to achieve greater accuracy and can provide the physician more information about the heart or other organ than current techniques.

SUMMARY OF THE INVENTION

A method for determining the contour of a chamber in an in vivo heart, based on image data of the heart, uses a sequence of image frames made during at least one cardiac cycle. The sequence of image frames include a region of interest in which the chamber is disposed and are recorded at substantially equally spaced intervals of time. Each image frame comprises a plurality of pixels, and each pixel has a gray scale value. The pixels in each image frame of the in vivo heart are classified by indicating whether the pixels are more likely to be inside or outside the contour of the chamber, as a function of a probability, to determine an initial estimate of the contour. In this step, training data derived by manually analyzing contours of a corresponding chamber in a plurality of other hearts are used. The probability associated with each pixel's disposition relative to the contour is dependent upon the gray scale values for the pixels in successive image frames in relation to classes determined using the training data. The initial estimate of the contour is refined by applying motion constraints to the contour in successive image frames. These motion constraints determine limits for the movement of each point on the initial estimate of the contour, between successive image frames.

The contour of the chamber thus determined is further refined by using global shape constraints to process coordinates of a portion of the contour that is defined with greater certainty, in order to determine coordinates for another portion of the contour that is defined with less certainty. The global shape constraints are based on the training data derived from manual evaluation of the contours of the corresponding chamber in other hearts.

The method also comprises the step of testing the contour of the chamber of the in vivo heart that is thus determined, for consistency, based upon a comparison of the contour to parameters determined from the training data.

Preferably, the training data are developed by producing a sequence of training image frames over at least one cardiac cycle for each of the other hearts. The training image frames also each comprise a plurality of pixels, and each pixel is disposed at a row and a column in the training image flames and is associated with a vector of gray scale values for that pixel's position through the image frame sequence. The contour of the chamber for each of the other hearts in each of the training image frames is manually determined. A class is assigned to each pixel in each sequence of training image frames, for each of the other hearts. The class that is assigned is determined based upon whether: (a) the pixel's position in the training image frames remained inside the contour that was manually determined throughout the cardiac cycle; or (b) the pixel's position in the training image frames remained outside the contour that was manually determined, throughout the cardiac cycle; or (c) for at least one of the image frames, the pixel was inside the contour that was manually determined during part of the cardiac cycle and, was outside the contour for a remaining part of the cardiac cycle. If the latter condition applies, the training image frame in which a change occurred in the disposition of the pixel relative to the contour determines the class of the pixel in each image frame. Each possible condition relating the location of a pixel inside and outside of the contour and the flame in which the location changed (if it did) represents a different class.

Another step in the method includes assigning a mean, a covariance, and a class probability to each pixel in the training image frames, for each of the other hearts, based on the gray scale values of the pixels in the sequence of training image frames and on the class assigned to the pixels. The mean, covariance, and class probability comprise a priori information derived from the training data.

The step of refining the initial estimate preferably comprises the steps of determining boundary motion data for contours of the other hearts, and estimating structuring elements describing the motion constraints based upon the boundary motion data, for each of the training image flames during one cardiac cycle.

In one preferred form of the invention, the chamber of the in vivo heart is a left ventricle. (It should be noted that this method can also be applied to determine the contour of other in vivo organs and of other chambers of the heart beside the left ventricle.) The image frames for a systole portion and for a diastole portion of the cardiac cycle are then processed separately to determine the contour of the chamber of the in vivo heart.

Yet another step of the method is determining an end systole image frame for the in vivo heart. This is done by a classifier that uses a frame by frame histogram of the gray scale values in the region of interest over the sequence of image frames. The classifier employs histograms of the gray scale values to determine the end systole image frame, which generally represents the image frame having the smallest area of bright pixels in the region of interest.

A further aspect of the present invention is a method for diagnostically analyzing and evaluating physiological functions of an in vivo organ using the image data, based upon a determination of the contour of the organ and its change over a sequence of image frames. By observing the manner in which the contour changes in different image frames in the sequence, the physiological function of the organ can be evaluated to determine, for example, whether a valve in a heart chamber is leaking or whether a muscle comprising a wall of the heart is weak. Evaluation of the contour of a single image frame generally cannot provide equivalent information to the physician.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The Imaging Apparatus

Figure 1:
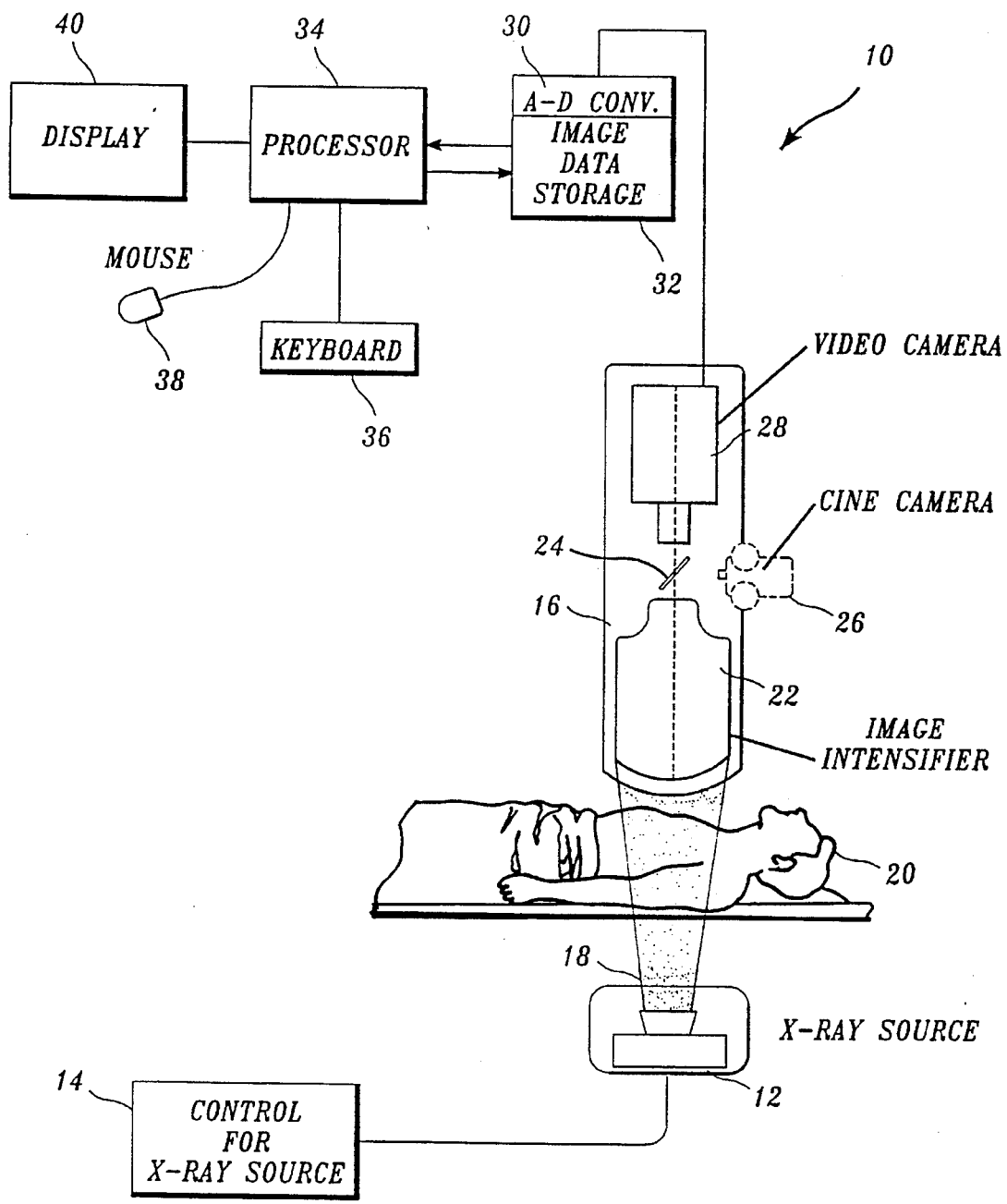
FIG. 1 is a schematic diagram illustrating equipment used to produce X-ray images of an internal organ and the apparatus used for processing the images to determine the contour of the organ in accordance with the present invention.

A generally conventional X-ray imaging facility 10 is shown in FIG. 1. Also shown is the equipment necessary to process the X-ray images produced by the apparatus in accordance with the present invention, so that a contour of an organ can be determined and displayed.

In X-ray imaging facility 10, an X-ray source 12 is energized with electrical current supplied by a control 14, which determines the level of the current, the voltage applied to the X-ray source, and the time interval during which the electrical current is provided. In response to the signals supplied by control 14, X-ray source 12 produces a beam 18 of X-rays that pass through the chest of a patient 20 and into a detector 16. X-ray source 12 and detector 16 are aligned along a common longitudinal axis, so that beam 18 passes through a region of interest in the chest of patient 20. The organ that is being imaged is generally disposed within the center of the region of interest and within the center of beam 18. After passing through the chest of patient 20, beam 18 enters an image intensifier 22 in detector 16, which converts the beam of X-rays into a corresponding optical image.

To more clearly delineate the organ that is disposed in the region of interest from surrounding soft tissue, a radio opaque contrast substance, such as an iodine compound, is injected into the organ, to absorb or block more of the X-ray beam energy than the surrounding soft tissue. As a result, the interior of the organ appears relatively brighter, compared to the surrounding background, in the image produced by image intensifier 22. A partially silvered mirror 24 is disposed along the longitudinal axis of detector 16, so that a portion of the light comprising the image produced by image intensifier 22 is reflected in a direction transverse to the longitudinal axis of the detector and into the lens of a cine camera 26 (optional). The remainder of the light comprising the image is transmitted through partially silvered mirror 24 along the longitudinal axis of detector 16 and into the lens of a video camera 28.

In the illustrated embodiment, video camera 28 produces an analog signal resulting from scanning the image produced by image intensifier 22. Alternatively, the images produced by image intensifier 22 can be projected into a video camera (not shown) that is external to the detector. The analog signal comprises a voltage for each pixel of the image, the value of which is indicative of a gray scale value or intensity level at the pixel. The analog signal is input to an analog-to-digital converter (ADC) 30, which converts the voltage representing the gray scale value for each pixel to a corresponding digital value. It should be noted that certain types of video cameras are able to directly produce a digital output signal, and if such a video camera is used, ADC 30 can be eliminated.

In the preferred embodiment, the gray scale level can range between 0 and 255 for any pixel in the digital image data (but in fact, the darkest and brightest pixels may encompass a much smaller range). It should be noted that the digital image data produced by the X-ray facility at each spaced apart interval of time is referred to throughout this specification and in the claims as an "image frame."

In the preferred embodiment, a plurality of image frames of the organ at spaced-apart times are produced by setting control 14 so that X-ray source 12 is repetitively, briefly energized. In the exemplary application of the present invention discussed below, the region of interest imaged by beam 18 includes the heart of patient 20, and more specifically, the left ventricle (LV) of the heart. By processing a sequence of digital image frames of the LV that have been made over at least one cardiac cycle, the preferred embodiment of the present invention automatically determines the contour of the endocardial surface of the LV at multiple times during the cardiac cycle.

The digital image data for each of the image frames is stored in an image data storage device 32, which preferably comprises a large capacity hard drive or other non-volatile storage media. Image data storage device 32 is coupled bi-directionally to a processor 34, which preferably comprises a desktop personal computer, or a work station. A keyboard 36 and a mouse 38 (or other pointing device) are coupled to processor 34 to enable the operator to input data and/or instructions used for controlling the software running on processor 34. This software is used to implement the method of the present invention, which enables the digital image data stored as image frames in image data storage device 32 to be processed to produce a contour of the LV at different times during the cardiac cycle. The contour of the LV in an image frame that is thus automatically determined by the method is presented to the user on a display 40, which is coupled to processor 34. In addition, data defining the contour determined by processor 34 can optionally be stored in image data storage device 32, for later analysis and evaluation.

Object of the Method

Figure 2:
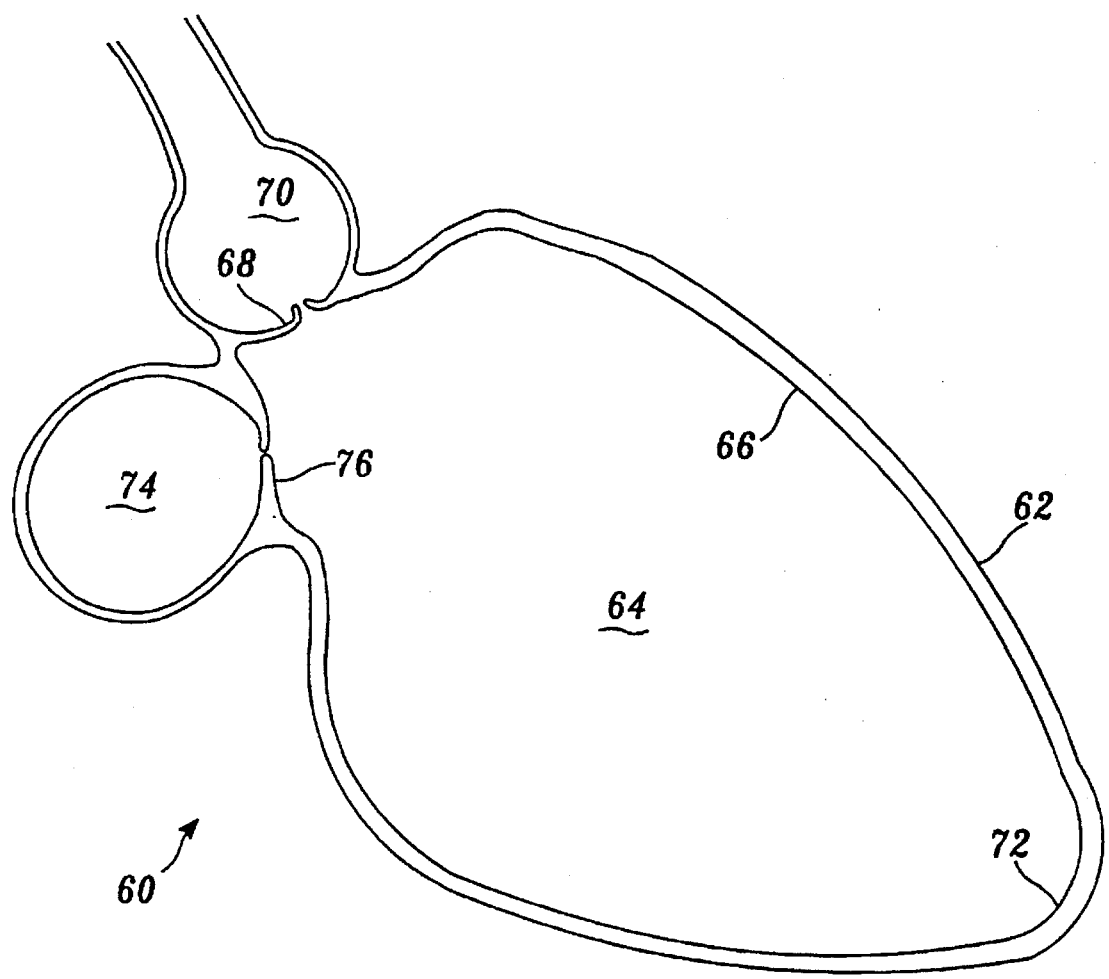
FIG. 2 is cross-sectional of part of a human heart that includes the left ventricle.

Referring now to FIG. 2, a cross-sectional view of a portion of a human heart 60 corresponding to a projection angle typically used for recording ventriculograms has a shape defined by its outer surface 62. Prior to imaging a LV 64 of heart 60, the radio opaque contrast material is injected into the LV so that the plurality of image frames produced using the X-ray apparatus include a relatively bright area within LV 64. However, those of ordinary skill in the art will appreciate that in X-ray images of the LV, the bright silhouette bounded by the contour of an endocardium (or inner surface) 66 of LV 64 is not clearly delineated. The present method processes the image frames produced with the X-ray source to obtain a contour for each image frame that closely approximates the endocardium of the patient's LV.

It should be noted that although image frames produced using an X-ray source are disclosed as the type of image data processed in the preferred embodiment of this invention, the present method is also applicable to processing other image data from other sources, including ultrasound and nuclear magnetic resonance image data. The image frames produced by any of these techniques are difficult to interpret to determine the contour of the LV, since the contour of the LV (or other organ being examined) is typically not clearly delineated. With regard to the LV as the exemplary organ of interest, the lower portion of the contour at an apex 72 is normally indicated by the contrast silhouette in the image frames with much less clarity than the upper portion of the LV, adjacent aortic valve 68, which opens into aorta 70, and mitral valve 76, which opens into part of left atrium 74.

During the cardiac cycle, the shape of LV 64 varies and its cross-sectional area changes from a minimum at end systole, to a maximum at end diastole. The cross-sectional area and the shape defined by the contour of the endocardium surface change during this cycle as portions of the wall of the heart contract and extend. By evaluating the changes in the contour of the LV from image frame to image frame over one or more cardiac cycles, a physician can diagnose organic problems in the patient's heart, such as a leaking mitral valve or a weakened myocardium (muscle) along a portion of the wall of the LV. These physiological dysfunctions of the heart are more readily apparent to a physician provided with contours of the heart over the cardiac cycle. The physician is alerted to a possible problem if the contour does not change shape from frame to frame in a manner consistent with the functioning of a normal heart. For example, if a portion of the LV wall includes a weakened muscle, the condition will be evident to a physician studying the relative changes in the contour of the LV in that portion of the wall, compared to other portions, since the portion of the endocardium comprising the weakened muscle will fail to contract over several image frames during systole in a normal and vigorous manner. Similarly, over multiple cardiac cycles, valve leakage will be evident from an evaluation of the contours.

The capability to automatically determine the contour of the LV immediately after the images are acquired can enable a physician to more readily evaluate the condition of the heart during related medical procedures. It is expected that the present method should produce contours of the LV or other chamber of the heart (or other organ) during one or more cardiac cycles, with an accuracy at least equal to that of an expert in evaluating such images, and should accomplish this task substantially faster than a human.

Overview of the Method

Figure 3:
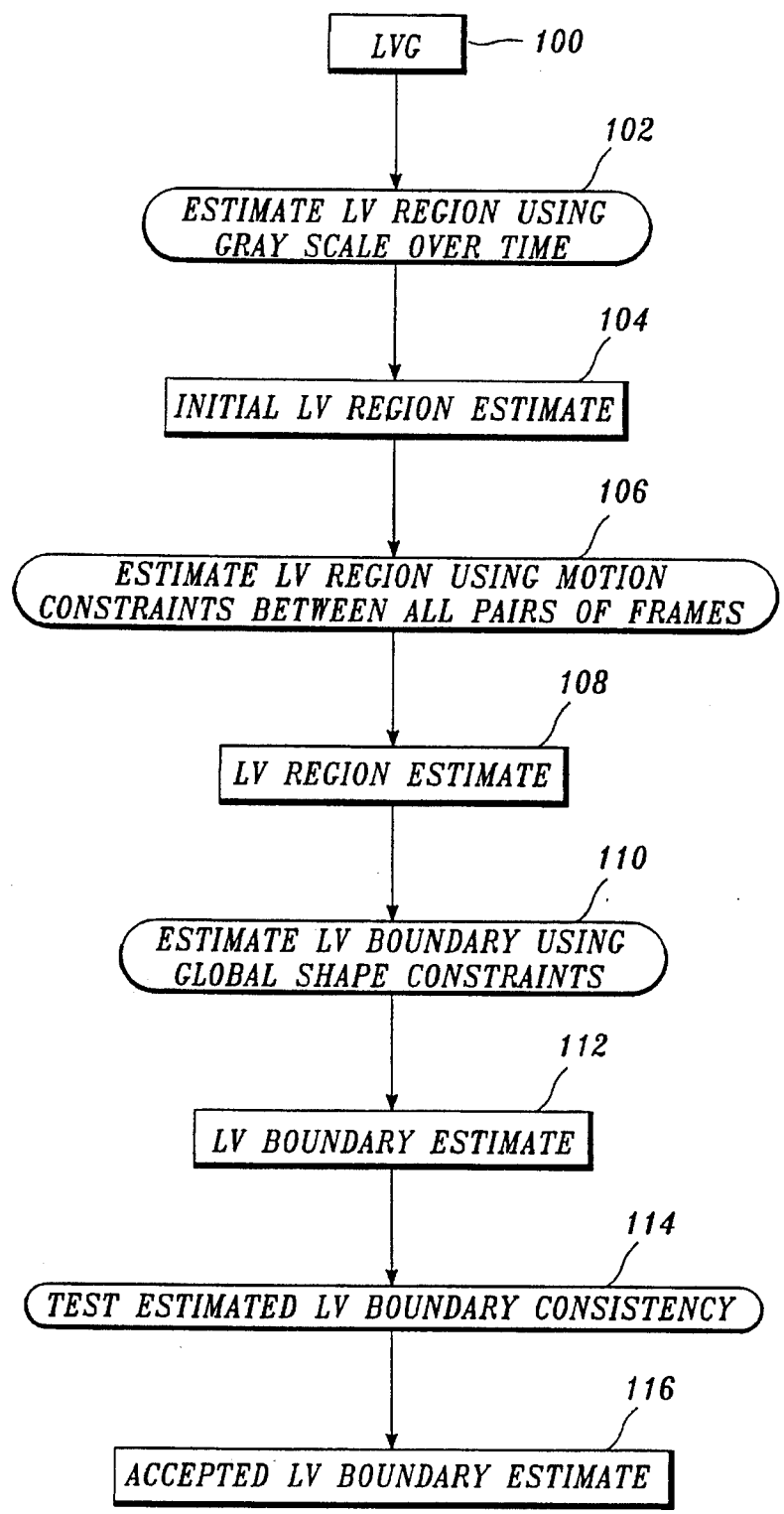
FIG. 3 is flow chart showing an overview of the process steps employed in the present invention to determine the contour of a left ventricle, at multiple times over a cardiac cycle, based on a plurality of image frames during the cardiac cycle.

An overview of the steps involved in automatically determining the contour of the LV is shown in FIG. 3. As explained above, this sequence of digital image frames comprises the input for the process that is used to determine the contour of the LV. The input data are referred to as left ventriculogram (LVG) data 100. In a block 102, an initial estimate of the LV region, and thus of the contour of the LV is made over a time interval that extends through one cardiac cycle. This initial estimate is a function of the gray scale values for each pixel in each of the image frames monitored during the cardiac cycle. To form the initial estimate, a Bayesian classification approach is used to classify each pixel as a function of its location and its gray scale value, by reference to parameters that have previously been determined through manual evaluation of training data. The training data, as will be explained in detail below, are image data that were produced by imaging the LVs in the hearts of a plurality of other individuals. By thus classifying each of the pixels in the image frames for the patient as being inside the LV contour or outside, the initial estimate of the LV region is produced, as referenced in a block 104.

The next process step that is applied is shown in a block 106. Specifically, the initial LV region that was estimated from block 104 is further refined by applying motion constraints to changes in the contour of the region between successive pairs of image frames. These motion constraints are also developed using the training data, by determining a range of displacement for points on a boundary or contour of the LV, between any two consecutive time points, for each of the LVs of the other hearts used to produce the training data, to determine structural elements. These structural elements define limits for the movement of the LV contour between successive frames that are applied to the initial estimate of the LV region for the current patient. The further refinement resulting from applying the motion constraints yields a LV region estimate, in accord with a block 108.

As noted above, apex 72 of the LV contour is a portion of the endocardium that is most difficult to delineate in imaging data. The radio opaque material used to provide contrast in the images produced with the X-ray source is normally injected into the middle of the LV and often does not mix well with the blood in the lower region of the apex. In addition, if the LV of the patient is characterized by a good contractile function, the radio opaque material may be ejected from the LV before reaching the apex. Accordingly, a process step 110 is provided to more reliably determine a contour of the LV in the region centered around the apex, by applying global shape constraints to determine the portion of the contour at the apical region as a function of the remaining portion of the contour. This step uses the previously collected training data to determine the global shape constraints. The manually determined contours for the LV in other hearts are evaluated to determine the relationship between the upper two-thirds of the LV contours and the portions of the contours proximate the apex. By using this relationship to evaluate the LV region estimate from block 108, the process step in block 110 produces a LV boundary estimate, as noted in a block 112.

Although the boundary estimate in block 112 should represent a reasonably accurate contour of the LV, a further step in a block 114 determines if the estimated LV boundary in each image frame is consistent with a range of contours that would be expected. The step in block 114 simply ensures that no anomaly has been introduced during the process of determining the estimated contour, by re-evaluating the boundary in terms of the parameters derived from the training data for the LVs of other hearts. If the boundary estimate for each image frame passes these tests, the method yields an accepted LV boundary estimate in a block 116, which a physician or other medical practitioner can view to diagnose the condition of the heart and for other purposes discussed above. Since the boundary is estimated for each of the image frames, changes between image frames are readily evident, yielding valuable information that enables the physician to more accurately diagnose certain disease conditions.

Details of the Method

There are several initial assumptions made in carrying out the detailed steps of the method generally described above. First, the end systolic frame must either be known through manual identification or automatically identified by processing the image frames comprising LVG data 100. Secondly, it is assumed that there is a monotonic boundary motion in the systole and diastole portions of the cardiac cycle. Third, the aortic valve plane for the heart must be known, to establish the orientation of the LV in the image frames. Fourth, the LV should be approximately centered within the image frames. Finally, in the initial estimate of the LV region, it is assumed that even if areas within the LV have been missed, the area outside the LV is not included. It is expected that most of these assumptions can be loosened or eliminated once additional experience is gained in applying this method. Some of the assumptions can be-eliminated by adding-additional processing to the method to ensure that the contour of the LV that is produced is not biased toward an error as a result of having failed to consider the assumptions.

The location of each pixel in an image frame sequence is determined by its row and column coordinates. A vector of gray scale values for each pixel through the entire image frame sequence is associated with each row/column position. In addition, the method employs a "feature vector" for each pixel, which is its vector of gray scale values throughout the sequence, with added elements indicating its row/column position, and its distance from the center of the region of interest. The training data establish a set of feature vectors for each class. In the preferred embodiment, the training data are normalized to provide 12 image frames for systole and 18 image frames for diastole.

Figure 4:
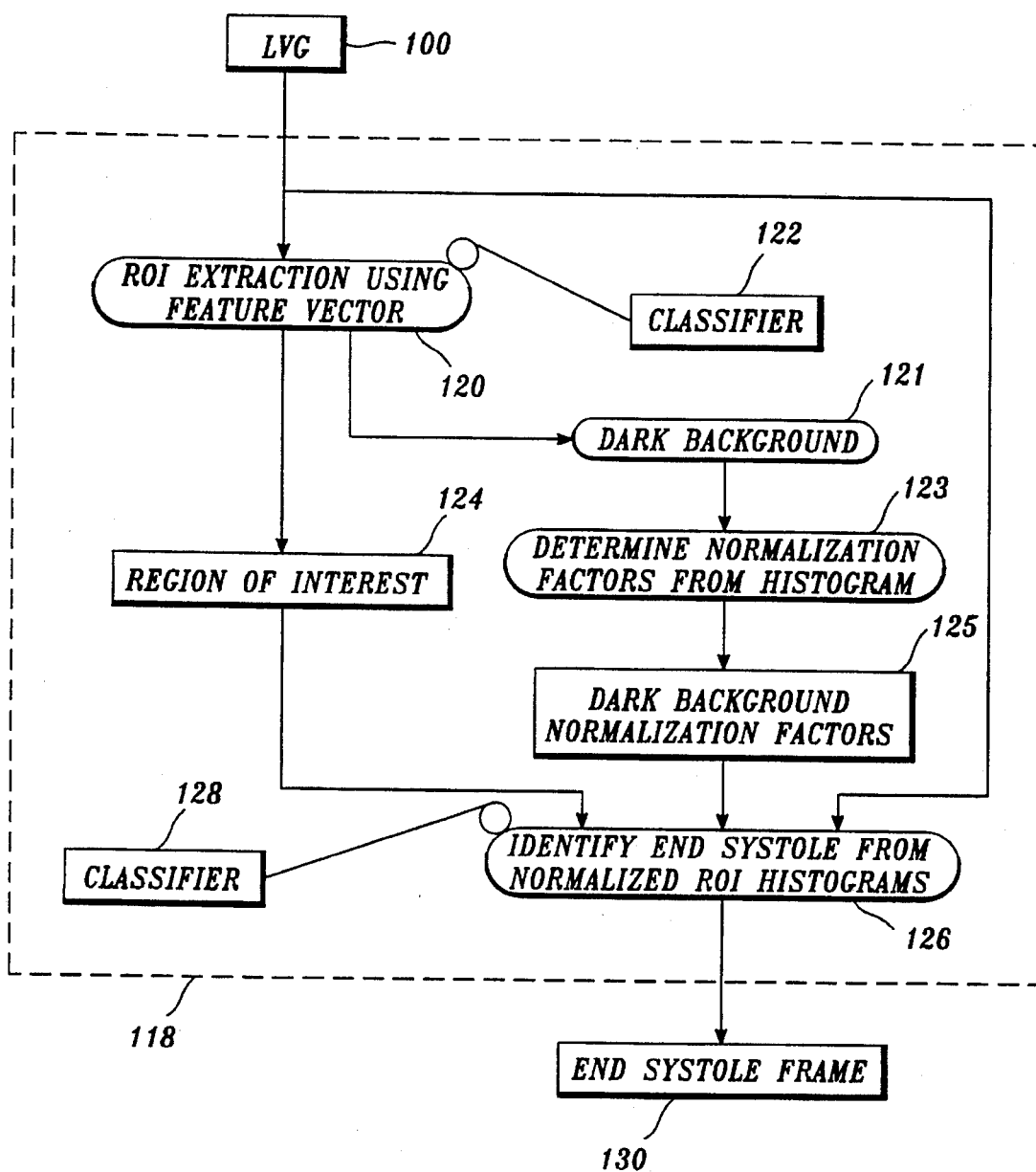
FIG. 4 is a flow chart illustrating the process logic for determining an end systole image frame in a sequence of image frames extending over at least one cardiac cycle.

Although the end systole frame could be manually determined, as indicated in a block 118 shown in FIG. 4, the end systole frame is preferably automatically determined. The LVGs in block 100 serve as an input to a block 120 that provides for extracting a region of interest (ROI) using the pixel feature vectors. In connection with this step, a simplified classifier shown in a block 122 is employed. Classifier 122 uses parameters derived from training data produced for the LVs in a plurality of other hearts. The training data are processed to identify three regions in the training image frames relative to the manually drawn contours, and the pixels in the training image frames are classified based upon their disposition within one of the three regions. These regions include a light background region (which is excluded from the region of interest because it represents a mechanical shutter employed in the imaging apparatus), a dark background region, and a foreground region (i.e., the region inside the manually drawn contour). A set of contours for all image frames and for all of the LVs of the other hearts is defined by collecting all of the pixels that were classified as being in the foreground region for the training data. Based upon the set of contours that define the region of interest for the training data and the average gray scale values of all of the pixels that lie within each of the regions, classifier 122 can then determine a region of interest for LVG data 100, as noted in block 120.

The step in block 120 is carded out as follows. All pixels of the image frames included in LVG data 100 are evaluated by classifier 122 using the pixel feature vectors to determine whether each pixel lies within a region of interest, as indicated in a block 124. The dark background, indicated in a block 121, is also defined using classifier 122. This process is repeated for each pixel in the LVG data 100 until all pixel positions are processed, yielding the region of interest in block 124 and the dark background in block 121 for the sequence of image frames included in the LVG data.

The next step is to consider the gray scale values of the pixels in the dark background of block 121 for each of the image frames comprising LVG data 100. It should be apparent that the relative gray scale values for each pixel in a set of image frames can vary significantly due to differences in the intensity of the X-rays, sensitivity of the detector, and other factors. Accordingly, for the pixels in the dark background in each image frame, a histogram is produced, as indicated in a block 123. Each dark background histogram includes separate totals indicating the number of pixels, in that image frame, having identical gray scale values, i.e., a total for each different gray scale value found in the dark background in the image frame. The dark background histograms are then used to define normalization factors as shown in a block 125. These normalization factors will be used, as explained below, to compensate for the above mentioned variation in relative gray scale values between image frames. Together with the region of interest from block 124, the dark background normalization factors from block 125 are input into the process indicated in a block 126, to identify the end systole image frame.

The LV should have its smallest cross-sectional area at end systole. Also, the end systole image frame often corresponds to the image frame with the smallest area of relatively bright pixels within the region of interest. Therefore, histograms are produced of the pixels lying within the region of interest for each image frame. These histograms include separate totals for the number of pixels having the same gray scale value for each different gray scale value within the region of interest. The region of interest histogram of each image frame is then normalized for the variation in relative gray scale values between image frames, using the normalization factors from block 125. Each normalized region of interest histogram is used as a feature vector (different than the feature vectors derived from the pixel vectors) in a classifier 128, which determines the end systole image frame.

Classifier 128 uses parameters derived from training data produced for the LVs in the plurality of other hearts. The training data are processed to identify the end systole image frame from calculations of LV chamber volume derived from the manually drawn contours, the region of interest encompassing the manually drawn contours, the dark background region from classifier 122, and a gray scale histogram of the region of interest in each image frame of the training data. Also, as described above for block 123, the histogram of the dark background is produced in each training data image frame and used to define dark background normalization factors for the training data, just as discussed above in connection with block 125. These normalization factors for the training data are then used to normalize the region of interest histograms in each image frame of the training data. Finally, based upon the normalized region of interest histogram for each image frame of the training data, and upon the identity of the end systole image frame for each heart in these training data, classifier 128 can then determine the end systole image frame for LVG data 100, i.e., for the image data of the current patient, as noted in block 126.

Figure 5:
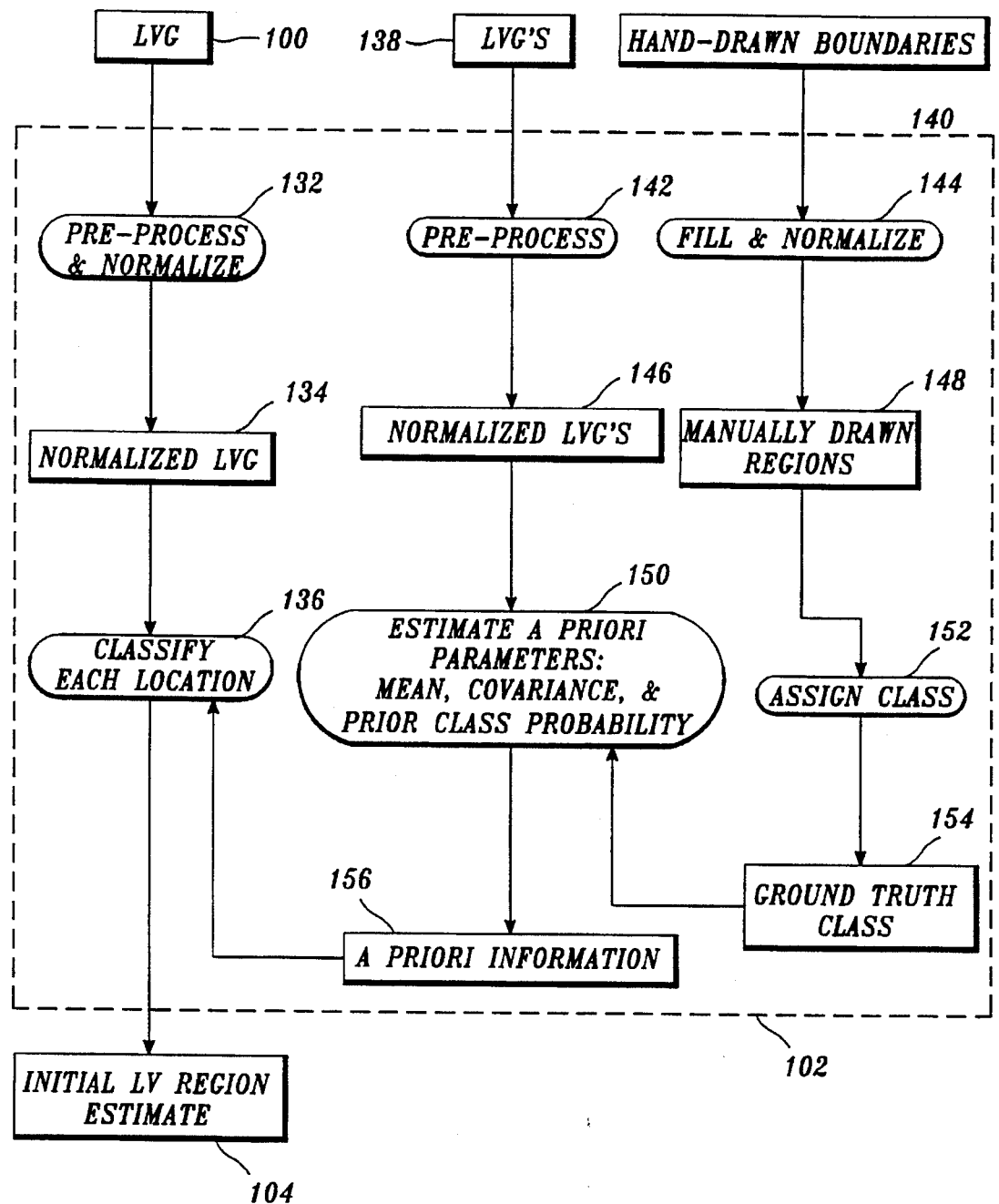
FIG. 5 is a flow chart showing the process steps used to estimate the contour of the left ventricle using gray scale values for pixels comprising the image frames.
Figure 6:
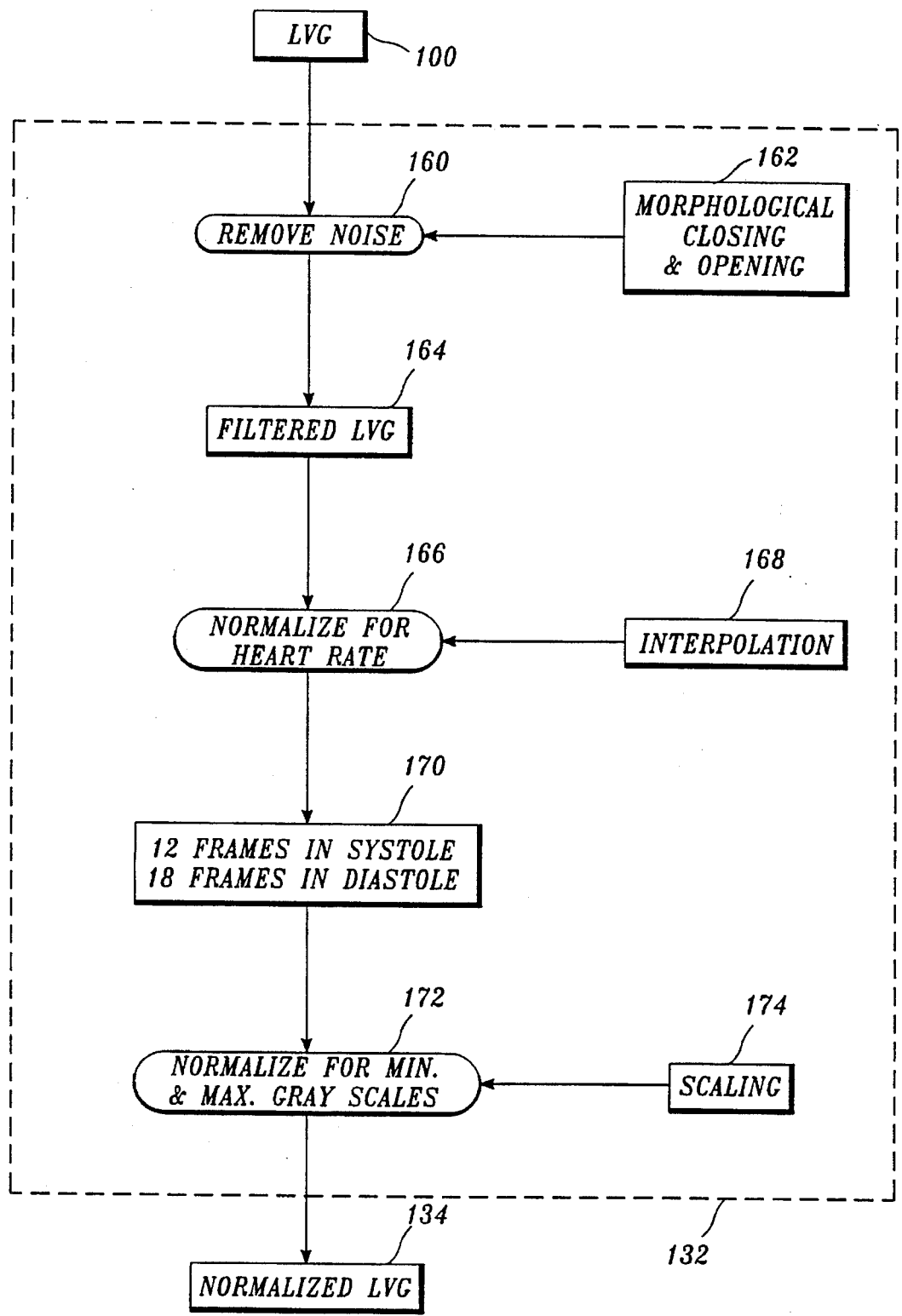
FIG. 6 is a flow chart illustrating the pre-processing and normalization steps applied to the image frame data.

The steps used for determining the initial LV region estimate in block 104 are shown in FIG. 5. Before the initial estimate can be made, the LVG data are preprocessed and normalized in a block 132. Details of block 132 are illustrated in FIG. 6 and reference is now made to that figure. In a block 160 "noise" is removed from LVG data 100 by using morphological closing and opening operators, as indicated in a block 162. A general primer discussing morphological operators is provided in a paper entitled, "Image Analysis Using Mathematical Morphology" by R. M. Haralick, S. R. Steinberg, and X. Zhuang, IEEE Trans. on Pattern Recognition and Machine Intelligence, Vol. 9, No. 4, pages 532–550, ( July 1987). A morphological closing operator operates on the LVG data by tending to lighten relatively darker spots disposed in brighter regions of the image frames. This process is analogous to using a trowel to level out low regions in mortar. To better understand this step, it is helpful to represent each image frame as a two-dimensional plane in which each pixel projects vertically upward in the third dimension to a height that depends upon its gray scale value. Thus, in a larger region of pixels having relatively high gray scale values, a small region of pixels having substantially lower gray scale values would appear as a small depression in the third dimension. By applying the morphological closing operator, this small region of pixels would have their gray scale values increased to be more consistent with the gray scale values of the brighter pixels surrounding them.

Similarly, the morphological opening process reduces relatively high gray scale values of pixels that appear as bright spots in a relatively darker region, so that they are more consistent with the lower gray scale values of pixels surrounding them. One of the characteristics of the morphological closing and opening operators used to remove noise is that they do not significantly alter sharp transitions between relatively light regions and dark regions. More conventional noise filtering techniques tend to smear such sharp transitions. The result of removing the noise from the LVG data comprises filtered LVG data, as shown in a block 164.

Although LVG data 100 are imaged over at least one cardiac cycle, the actual number of image frames comprising the data can vary, depending upon the heart rate of patient 20. Therefore, in a block 166, the filtered LVG data in block 164 are normalized for heart rate, using a conventional interpolation process, as noted in a block 168, to provide the required fixed number of frames. The purpose of the interpolation process is to ensure that there are a total of 30 image frames (in the preferred embodiment), equally spaced apart in time during the cardiac cycle, with 12 image frames occurring during systole and 18 image frames during diastole, as noted in a block 170. It should be apparent that it is possible to practice the present invention with different numbers of image frames than are used in the preferred embodiment.

As discussed above, variations in the brightness of the image frames arising from the imaging process must be accounted for by normalizing the gray scale values for their minimum and maximum values. This step is identified in a block 172. The normalizing process, referred to as scaling in a block 174, ensures that the range of gray scale values is consistent in all of the image frames of the set and falls within a desired range (0 to 255 in the preferred embodiment). Thus, normalized LVG data 134 are produced by the steps shown in block 132.

Referring back to FIG. 5, the normalized LVG data are input to a block 136, which provides for classifying each pixel in each of the image frames using a priori information 156, which is derived from the training data by manually determining the LV contours for a plurality of other hearts. The a priori information is determined as follows. In a block 138, a plurality of sets of LVG data for a plurality of other hearts is provided (produced using X-ray imaging facility 10 in FIG. 1, as already explained). The population selected for this purpose in testing the procedure included approximately 70 individuals, of which 20 could be characterized as having "normal" hearts, i.e., without any observable disease or functional problem. For each image frame in LVG data 138, and for each heart in the population of individuals from which the training data was collected, a physician who is expert in interpreting such image data produced manually drawn boundaries or contours of the LVs, as indicated in a block 140. The LVG data for each of these hearts was then pre-processed in a block 142, consistent with the pre-processing and normalization provided in block 132 for LVG data 100 of the current patient. It should be understood that all of the processing used to produce a priori information 156 from the training data is carried out prior to the analysis of LVG data 100 for the current patient. Image data storage device 32 stores the a priori information for use in the step of a block 136.

Preprocessing of all of the image frames of the training data produces training image frames of the LVG data in a block 146. Corresponding to the training image frames are manually drawn regions 148 of the training image frames that are produced by filling in the area within the manually drawn contour of the training image frames and normalizing to provide thirty training image frames over the cardiac cycle, as indicated in a block 144. The training image frames of manually drawn regions for the systole portion of the cardiac cycle in block 148 are input to a block 152. A class is then assigned to each pixel position of the training image frame sequence for each LV, yielding a ground truth class in a block 154. In the same manner, all pixels in the training image frames of LVG data 138 for the LVs of the other hearts are processed during the diastole, portion of the cardiac to provide another ground truth class for that portion of the cardiac cycle.

Figure 13:
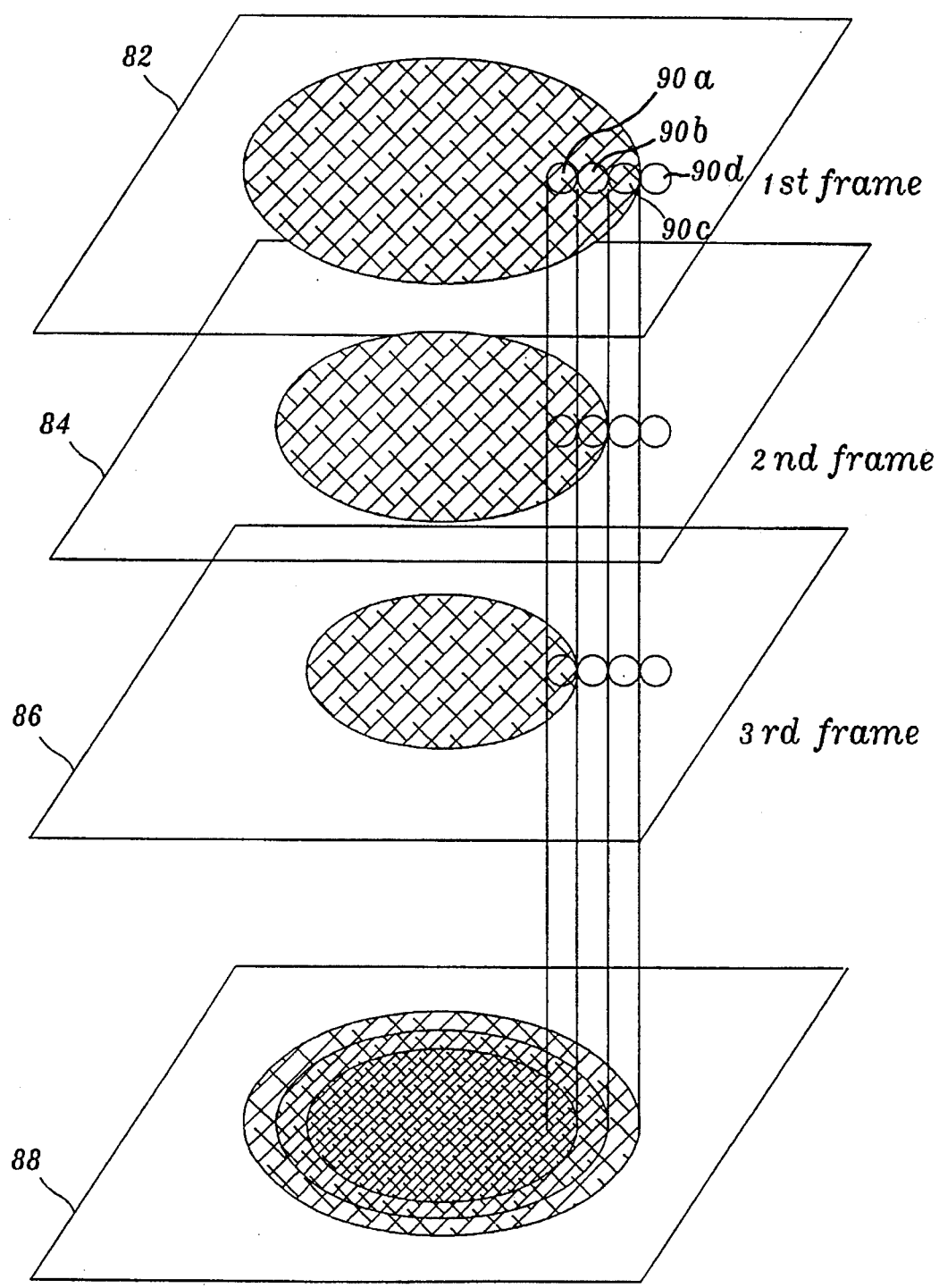
FIG. 13 is a simplified diagram showing how a class is assigned to corresponding pixels in multiple image frames.

The step used for assigning a class to pixels in block 152 is graphically illustrated in FIG. 13. In the simplified view that is illustrated for purposes of explanation, only three training image frames 82, 84, and 86 are shown (although as already indicated, there are 12 systole image frames in the preferred embodiment). Only four pixels 90a, 90b, 90c, and 90d are represented in each of the training image frames, but it will be understood that many more pixels comprise each training image frame. For the training image frames comprising a set of training image frames made over systole, some of the pixels, such as pixel 90d, are always outside the manually drawn contour in all of the training image frames. Similarly, in at least some of the training image frames, corresponding pixels, such as pixel 90a, are always within the manually drawn contour in all of the image frames during systole. Finally, some of the corresponding pixels in each of the training image frames, such as pixels 90b and 90c, will be inside the manually drawn contour during one or more training image frames and outside of the manually drawn contour in the remaining training image frames of systole.

Table 1 shows how the relative position of the corresponding pixels during the systole portion of the cardiac cycle is used to assign the ground truth class to the corresponding pixels. For the position of the pixels relative to the manually drawn contour shown in the table, a "0" indicates that the pixel is outside the contour and a "1" indicates that the pixel is inside the contour.

TABLE 1

|  | POSITION OF PIXEL RELATIVE TO CONTOUR | | | | | | | |
|---|---|---|---|---|---|---|---|---|
| FRAME | | | | | | | | |
| First  | 0 | 0 | 0 | 0 | 1 | 1 | 1 | 1 |
| Second | 0 | 0 | 1 | 1 | 0 | 0 | 1 | 1 |
| Third  | 0 | 1 | 0 | 1 | 0 | 1 | 0 | 1 |
| Class  | 0 | 1 | 2 | 3 | 4 | 5 | 6 | 7 |

If all of the corresponding pixels are outside the manually drawn contour in all of the training image frames, they fall in Class 0. Thus, pixel 90d is assigned Class 0. Similarly, for this simplistic example, if all of the corresponding pixels are always inside the contour in all of the image frames, they fall in a Class 7. Pixel 90a is assigned to Class 7. The remaining corresponding pixels in each of the image frames fall into a class that depends upon the image frame in which the pixel changed from being inside the contour to being outside of the contour. Thus, pixel 90c is inside the manually drawn contour in the first frame, but is outside in the second and third frames and therefore is assigned to Class 3. By the same logic, pixel 90b is inside the manually drawn contour in the first and second frames but is outside in the third frame and therefore is assigned to Class 6. The total number of classes that are mathematically possible is $2^N$, where N is the number of image frames. However, not all classes are rationally possible, due to the limited motion of the heart. Frame 88 in FIG. 13 graphically illustrates the four possible classes for this simple example, which are referred to as the ground truth classes.

Following the process just described, a ground truth class is assigned to the corresponding pixels in each of the systole training image frames for all of the LVs of other hearts. An analogous process is applied to the diastole training image frames; however, a corresponding pixel that was originally outside the image frame will be classified in accordance with the image frame in which it shifted inside the manually drawn contour. Block 154 therefore indicates that a ground truth class is determined for each of the corresponding pixels in each of the image frames during both systole and diastole.

For each of the image frames processed on the right-hand side of block 102 in FIG. 5, a corresponding training image frame is processed for the training data LVGs. The pixels in each set of training image frames are organized by the ground truth class assigned to them so that parameters including the mean, covariance, and class probability can be determined. These parameters comprise a priori information 156. The mean represents a mean gray scale value for all vectors having the same ground truth class designation, while the covariance is a measure of the degree of variation from the mean of gray scale values for each of the vectors having a common ground truth class. The prior class probability is simply the ratio of the number of pixels assigned to a particular common class, relative to the total number of different-classes to which all of the pixels are assigned. As indicated in block 136, the a priori information developed for systole is used for classifying pixels at each location in the set of image frames during systole. Then the a priori information developed for diastole is used for classifying the pixels during diastole. Details of this process are illustrated in FIG. 7.

Figure 7:
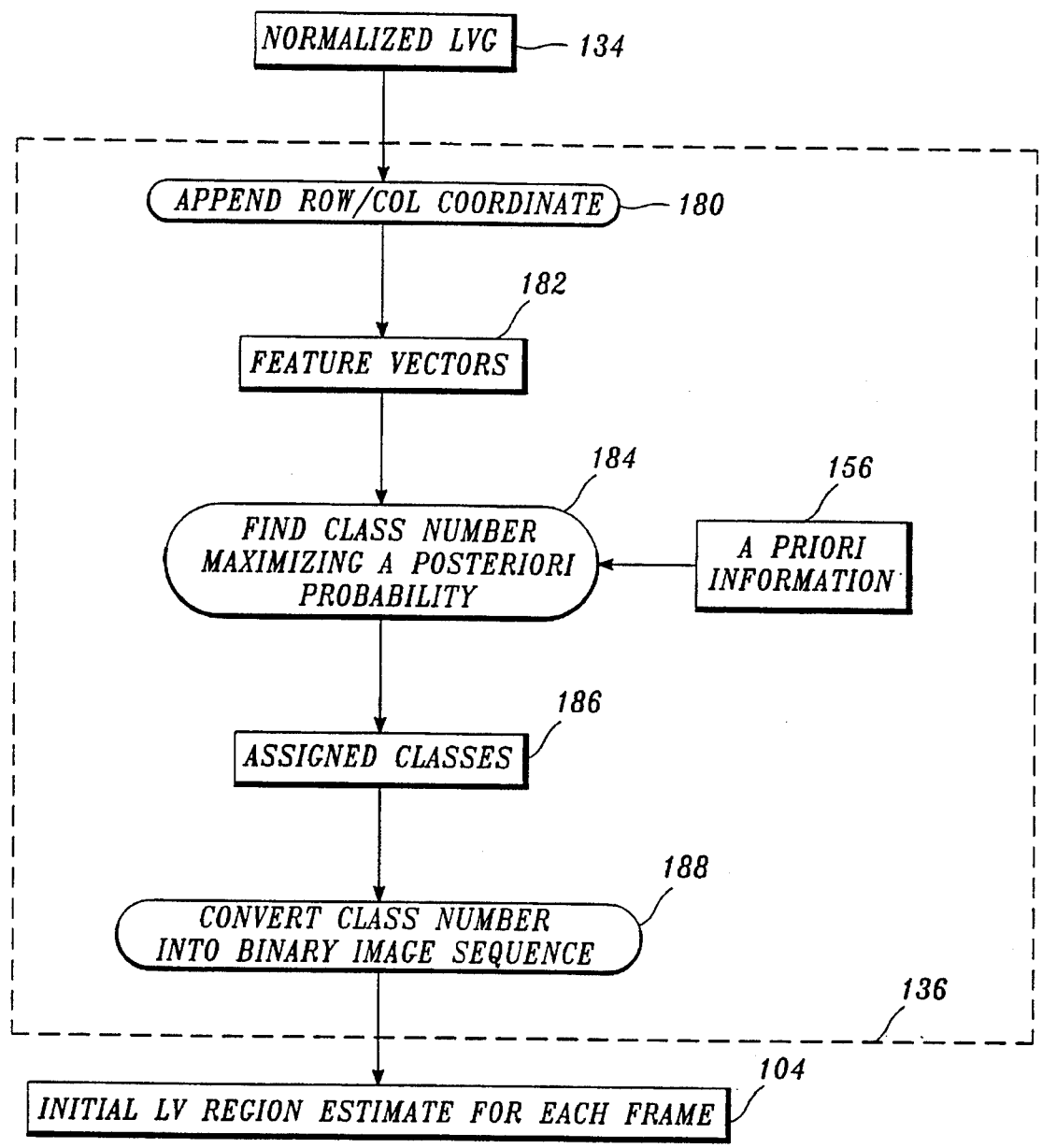
FIG. 7 includes details for the steps in FIG. 5 relating to classifying pixels to determine a binary image.

Referring now to FIG. 7, the normalized LVG data in block 134 are processed in a block 180 so that for all pixels in the image frames, feature vectors 182 are developed. Each feature vector includes the gray scale values for the pixels at the same location in each image frame, followed by the appended row and column coordinates of the pixels (and distance from the center of the region of interest). In a block 184, a class number is found that maximizes the a posteriori probability of the pixels so that a class number can be assigned, as indicated in a block 186. The a priori information derived from the training data includes probabilities for each class P(C) and class conditional probabilities P(X/C). In carrying out the procedure in block 184, for a feature vector X, this step finds the class that maximizes the a posteriori function P(C/X)=P(X/C)*P(C)/P(X). Further, for each Class C, each $X_i$ in Class C follows a multi-variate normal distribution $N(\mu_c, \Sigma c)$ where, (for the simple example of FIG. 13):

$$\mu_c = \begin{pmatrix} \mu_{c1} \\ \mu_{c2} \\ \mu_{c3} \end{pmatrix}, \Sigma_c = \begin{pmatrix} \sigma_{c1}^2 & \sigma_{c12}^2 & \sigma_{c13}^2 \\ \sigma_{c12}^2 & \sigma_{c2}^2 & \sigma_{c23}^2 \\ \sigma_{c13}^2 & \sigma_{c23}^2 & \sigma_{c3}^2 \end{pmatrix} \quad (1)$$

and where $\sigma_{ci}^2$, i=1, 2, 3, is the auto-covariance, and $\sigma_{cij}^2$, i=1, 2, 3, is the cross variance.

Once the class number is assigned, a block 188 provides for convening the class number into a binary image sequence, thereby producing image frames, which if displayed, would appear as black and white images, since any pixel that is inside the contour can be represented by a binary 1, and any pixel that is outside can be represented by a binary 0. As a result, the initial LV region is estimated for each frame, as noted in block 104.

Figure 8:
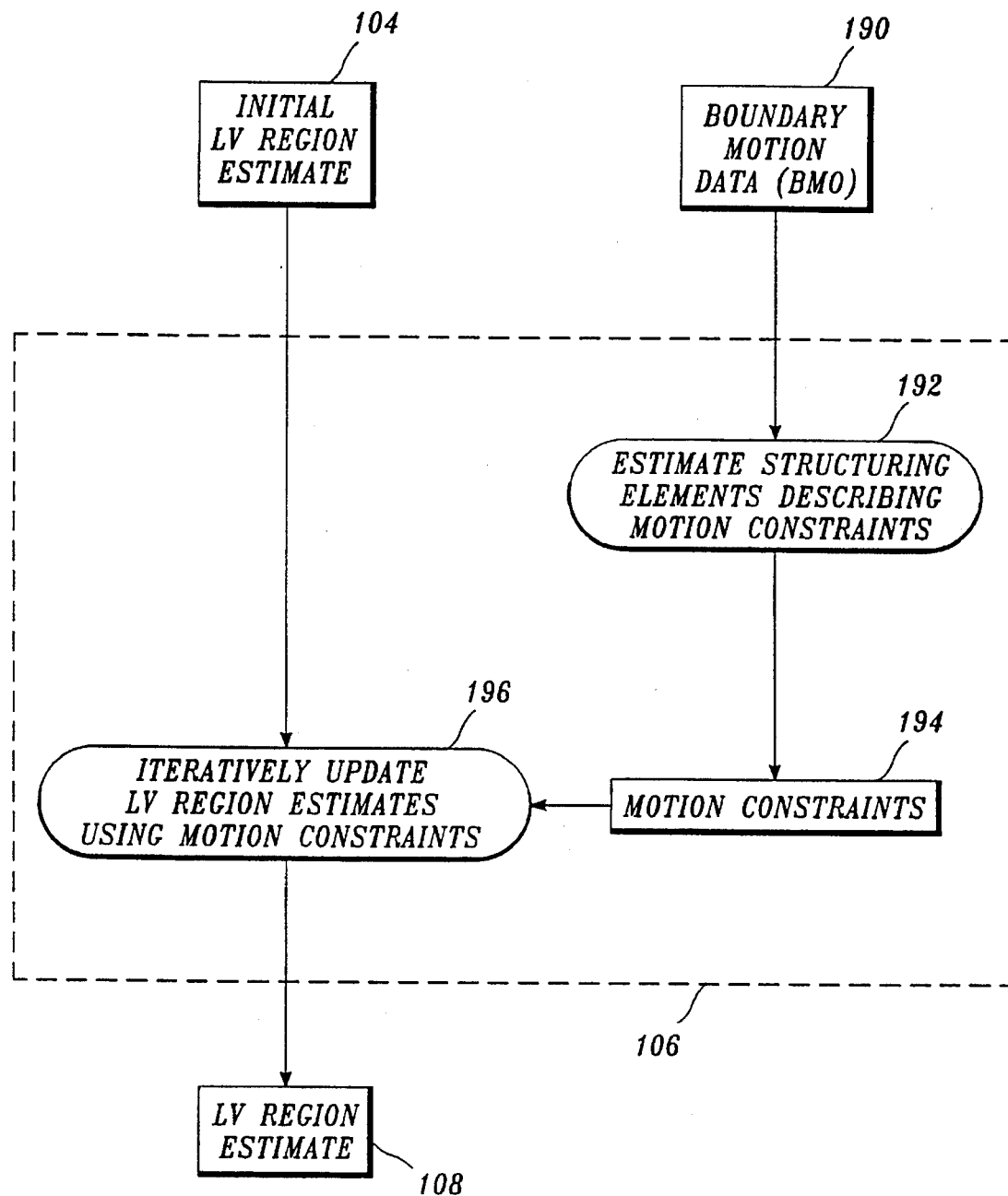
FIG. 8 is a flow chart illustrating the steps used to better estimate the contour of the left ventricle, based upon motion constraints derived from analysis of other left ventricles.

Referring now to FIG. 8, details of block 106 show how the motion constraints between all pairs of frames are applied to refine the LV region estimate. To accomplish this step, training data comprising boundary motion data (BMO) are input in a block 190. The BMO are used for estimating structuring elements that describe motion constraints in a block 192, as described below. In the preferred embodiment, when producing the BMO data, an attempt was made to select LVGs for hearts having a variety of disease states commonly seen in the U.S. general population pool. Deriving BMO data from a different population of hearts is expected to produce only a slightly different set of structural elements.

Figure 9:
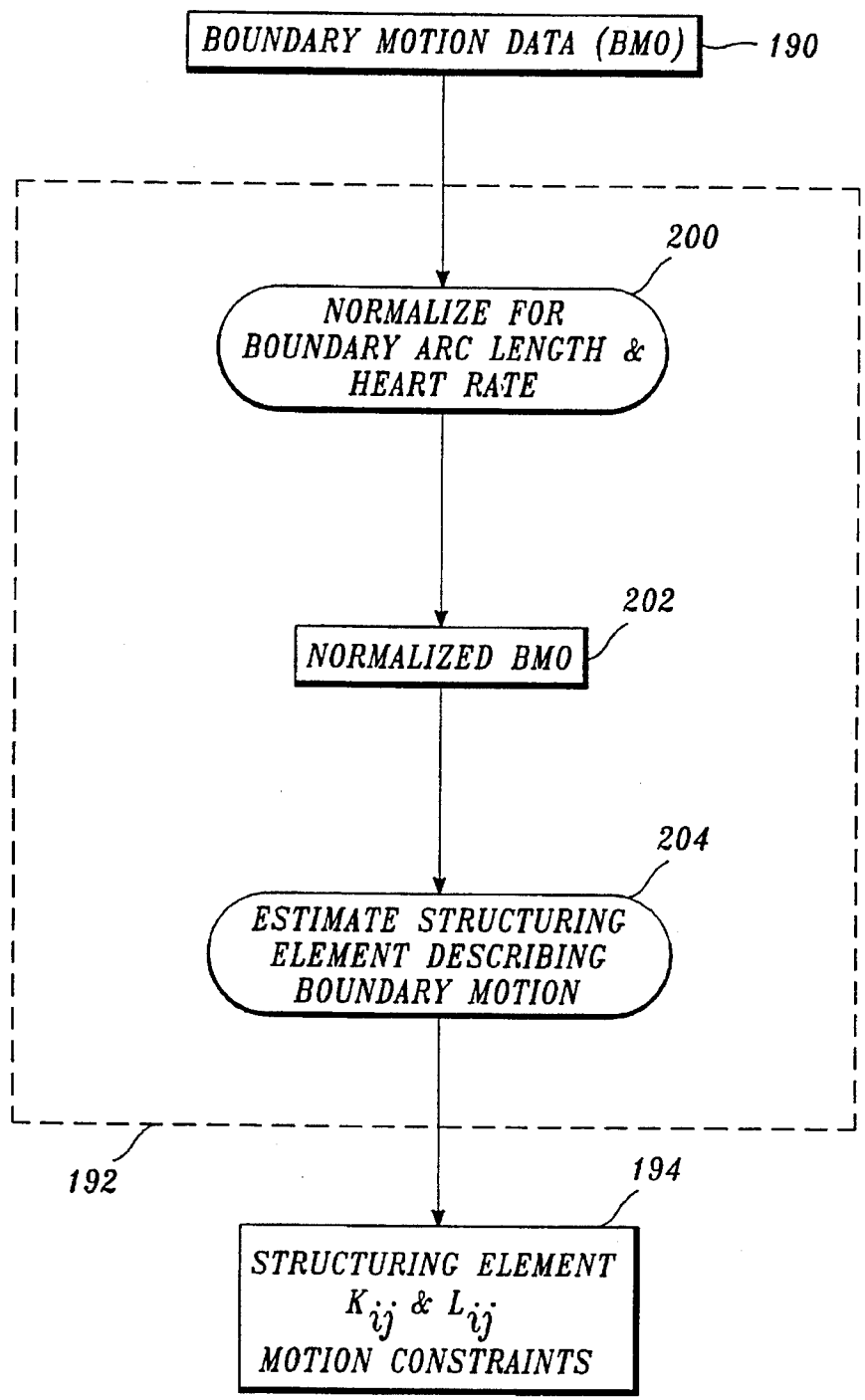
FIG. 9 is a flow chart showing further details used in estimating motion constraints, in regard to FIG. 8.

Details of block 192 are illustrated in FIG. 9. The BMO are input to a process that normalizes the data for boundary are length and heart rate in a block 200. Since the training data are derived from a plurality of sets of imaging data produced for a plurality of other individuals, it is necessary to normalize the data to accommodate the different size hearts used to produce the BMO and to accommodate the different heart rates of each of these other hearts. The resulting normalized BMO data 202 are input to a block 204 in which structuring elements describing the motion of the boundary or contour are estimated.

In developing the BMO data in block 190, the endocardial contours were manually determined for training image frames made over one cardiac cycle for 182 LVGs, i.e., for 182 LVs in the hearts of other individuals. The image frames were interpolated to 30 time points, including 12 in systole and 18 in diastole. Using the manually drawn contours or boundaries, a range of displacement between any two consecutive time points within diastole, and within systole, was determined at 100 equally spaced intervals around the contour for each of the training image frames comprising the normalized BMO data in block 202. The maximum inward and outward displacements of the contour from image frame to image frame were then expressed morphologically as two-dimensional structuring elements in block 204.

Figure 11:
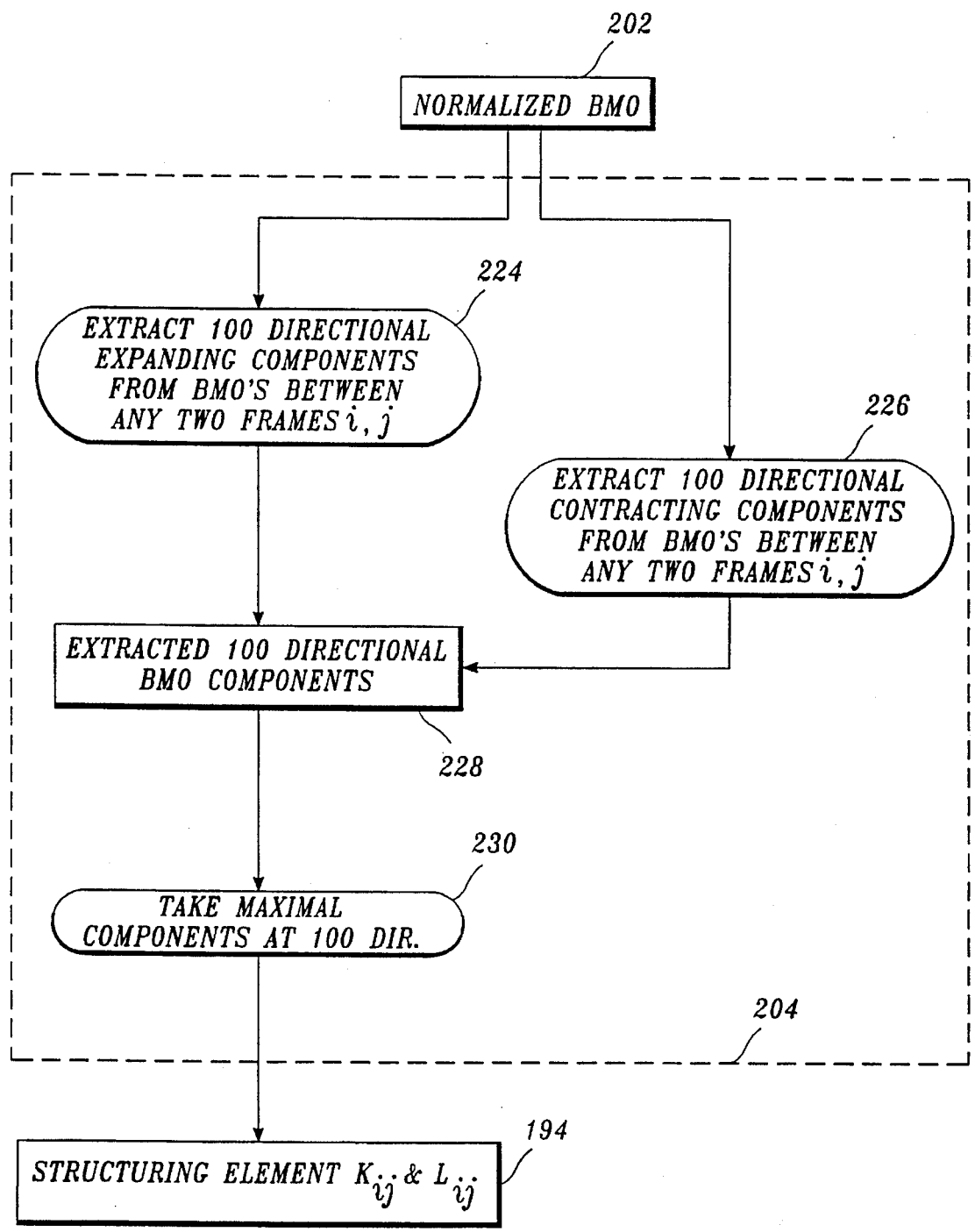
FIG. 11 is a flow chart showing further details in connection with estimating structuring elements used in determining motion constraints.

Details of the procedure for estimating the structuring elements are shown in FIG. 11. In a block 224, during systole, 100 directional expanding components are extracted from the BMO data between any two training image frames i and j. (Although training image frames immediately adjacent in time during the systole or diastole portion of the cardiac cycle can be used, it may also be possible to use training image frames that are more widely separated in time during each of these portions of the cardiac cycle.) Similarly, in a block 226, during diastole, 100 directional contracting components are selected from the BMO data between any two frames i and j. The step carried out in blocks 224 or 226 produces 100 directional BMO components, as indicated in a block 228. In a block 230, the maximal movement in each direction is determined, thereby producing the structuring elements $K_{ij}$ and $L_{ij}$, as indicated in a block 194.

The structuring elements $K_{ij}$ and $L_{ij}$ represent motion constraints, as indicated in block 194, that are applied to refine-the. LV contour of frame j using the information from the LV contour of frame i. If $I_t$ is one image frame at time t, and $I_s$ another image frame at time s, then to predict the bounds of $I_t$ from the boundary of $I_s$:

$$I_t \ominus L_{ts} \leq I_s \leq I_t \oplus K_{ts} \qquad (2)$$

where $L_{ts}$ and $K_{ts}$ are the structuring elements that represent the constraints on inward and outward motion, respectively, between time t and time s. Doing this refinement for pairs of image frames within the diastole and within the systole yields the LV region estimate in block 108. These structuring elements define an annulus in which any boundary of the LV should lie, given one boundary from any other image frame in the cardiac cycle. The motion constraints are then reiteratively applied to the initial LV region estimate of block 104, in a block 196 (FIG. 8), yielding the LV region estimate of block 108.

Figure 10:
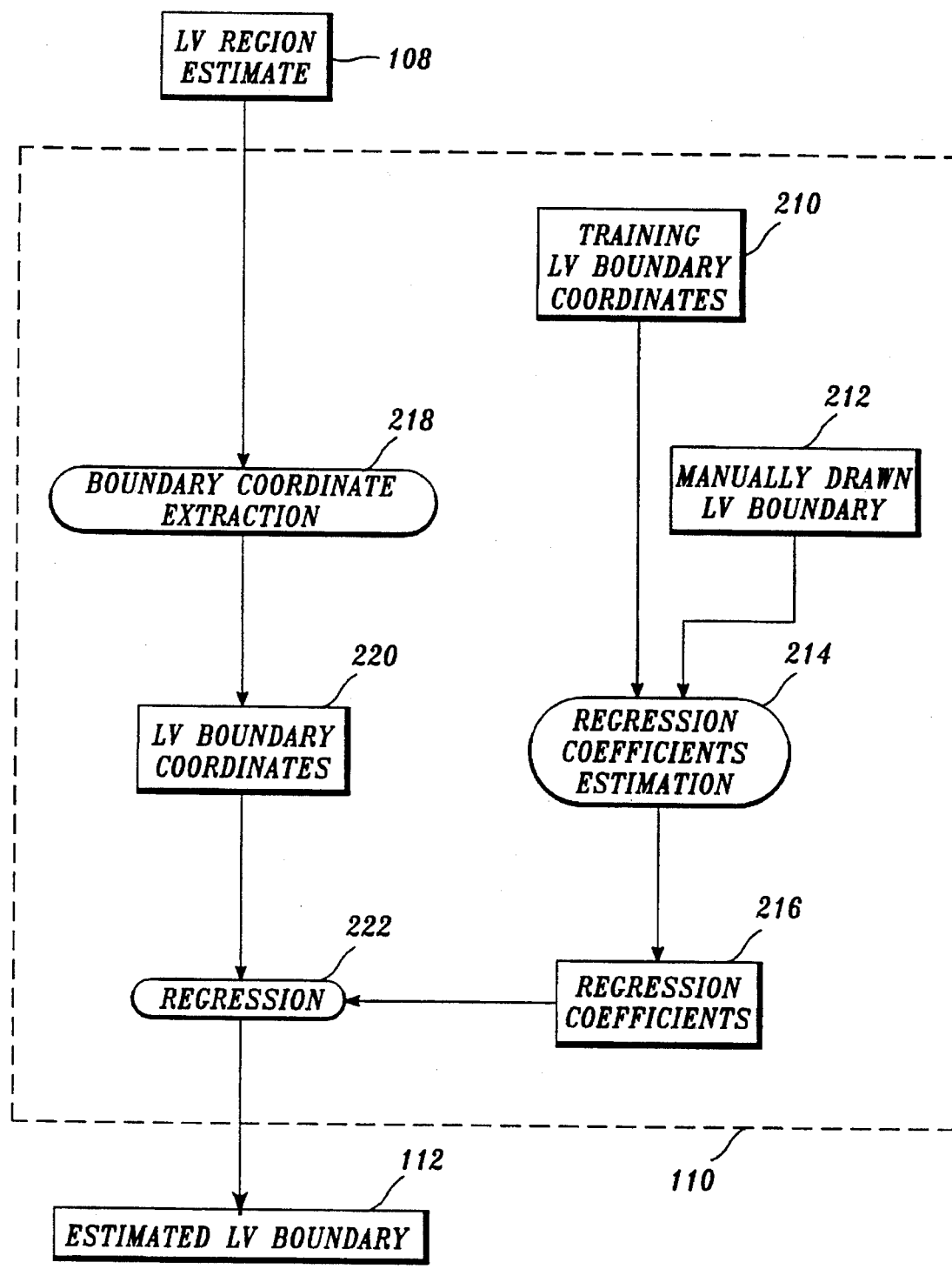
FIG. 10 is a flow chart showing the steps applied to estimate the contour near the apex of the left ventricle using global shape constraints.

Turning now to FIG. 10, the steps necessary to estimate the LV boundary using global shapes constraints in block 110 are disclosed. In this procedure, training data are again used. As shown in the figure, training LV boundary coordinates in a block 210 and the manually drawn boundaries or contours in a block 212 are both input to a block 214. The training LV boundary coordinates are computed or determined by applying the steps in blocks 102 and 106 (FIG. 1) to the training data, as described above, to determine estimated contours in each training image frame and then determining the coordinates of those contours. In block 214, regression coefficients are estimated that relate the training LV boundary coordinates computed for approximately the upper two-thirds of the contour in each training image frame to the manually-drawn boundary in the portion of the boundary in which the apex of the LV is disposed. As previously noted, the apex portion of the LV contour and region within the contour is less well defined in the image frames and is therefore less certain in the LV region estimate of block 108. The use of global shape constraints in block 110 is intended to compensate for this uncertainty about the apical region of the LV.

The regression coefficients indicated in a block 216 are produced by evaluating the computer produced contours from over 200 LVGs made for other hearts over one cardiac cycle so as to determine how the shape of the apical portion of the corresponding manually drawn contours is mathematically related to the shape of the upper two-thirds of the computer produced contours. To use the regression coefficients in block 216, a block 218 provides for extracting boundary coordinates of the contour from the LV region estimated for LVG data 100 in block 108. The boundary coordinates for the upper two-thirds of the contour are then input to a block 222, which applies a regression process using the regression coefficients in block 216 to determine the lower one-third of the contour in the apical region of the patient's LV. The result is the estimated LV boundary in block 112.

Figure 12:
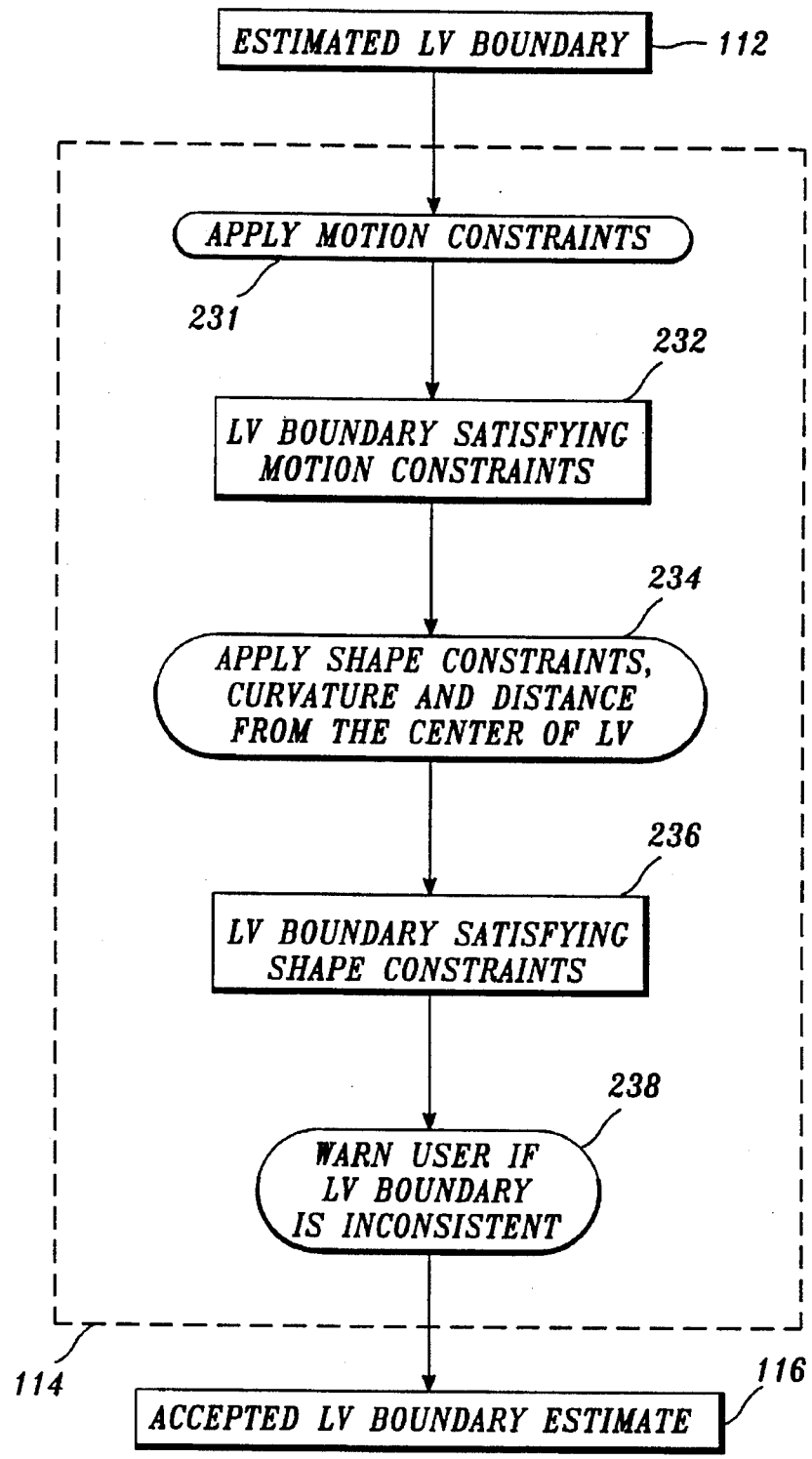
FIG. 12 is a flow chart showing the steps employed for testing the consistency of the contour estimated for the left ventricle.

Once an estimated LV boundary has been produced for each of the image frames in block 112, the result should preferably be tested to determine if a physician can justifiably rely upon it as a valid estimate of the contour. Details of the steps taken to test the estimated LV boundary for consistency are shown in FIG. 12. In this procedure, the motion constraints derived-from the training data are again applied in a block 231. The application of the global-shape constraints to determine the apical portion of the boundary may have introduced frame to frame changes that violate the motion constraints previously applied. The result of again applying the motion constraints is a LV boundary 232 for each image frame. These LV boundaries are input to a block 234, which applies shape constraints pertaining to curvature and distance from the center of the LV, as determined from the training data derived from the evaluation of the LVs in other hearts, based upon the manually-drawn contours.

A block 236 indicates that the resulting data satisfy the LV boundary shape constraints previously developed from the training data. If the resulting boundary data appear to inconsistent, user is visually warned by a message on the display that the boundary may be in error, in a block 238. Specifically, this step calls for checking the number of morphological inequalities that are not satisfied, and the area that the regression fills in at the apex. If either the number of inequalities is excessive, or the area indicated by the regression as being at the apex is too large, the borders will be rejected as having too low confidence for accuracy. If no such warning is generated, the boundary data for the image frames in block 236 comprise an accepted LV boundary estimate 116.

The accepted LV boundary for each of the image frames thus derived should be at least as accurate as a corresponding manually drawn boundary, since many of the steps used in automatically determining the contour or boundary rely upon contours derived from training data that were previously manually drawn by a person of special skill in interpreting such images. The automated process can rapidly produce the contour for each of the image frames, immediately after the image data are acquired, based upon the previously developed training data, and should therefore serve as an important and invaluable tool to the physician for use in cardiology and other internal medicine procedures.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for automatically determining a contour of an internal organ based upon digital image data of a region in which the organ is disposed, said image data representing a sequence of image frames of the region made over an interval of time during which a wall of the organ has completed at least one cycle of movement, the wall of the organ undergoing repetitive cycles of movement as part of the organ's physiological function, each image frame of said sequence of image frames comprising a plurality of pixels, said method comprising the steps of:

(a) developing an initial estimate of a region bounded by the contour of the organ in each image frame of the sequence, based upon a comparison of the image data with parameters derived from training data that were previously produced through manual evaluation of a plurality of image frames over a corresponding cycle for each of a plurality of corresponding organs in other individuals, said parameters derived from the training data being used to assign classes to the pixels comprising each of the image frames of the sequence, said classes indicating pixels that are most likely inside the contour of the organ in each image frame; and (b) using boundary motion data that were previously developed through manual evaluation of the corresponding organs in other individuals, refining the initial estimate of the region in each image frame of the sequence to determine the contour, said boundary motion data establishing an allowed range of motion of the contour between subsequent image frames of the sequence.

2. The method of claim 1, further comprising the step of more accurately refining the region estimated in step (b) for each image frame, by applying global shape constraints that relate physical shape attributes of the organ to the contour bounding the region.

3. The method of claim 2, further comprising the steps of evaluating the contour in each image frame for consistency by comparison of the contour for each image frame to constraints derived from the training data; and providing an indication to an operator if the contour is outside the constraints.

4. The method of claim 2, wherein the step of more accurately refining the region bounded by the contour comprises the steps of:

(a) using the training data, determining regression coefficients that define a probability distribution for the disposition of a structural landmark of the organ within a first portion of the contour as a function of a second portion of the contour that is different from the first portion;

(b) extracting contour coordinates for the contour estimated in step (1)(b) for each image frame of the sequence, including a more well defined portion of the contour in each image frame that corresponds to the second portion of the contour for the training image frames; and (c) using the regression coefficients in a regression process applied to the contour coordinates of the more well defined portion of the contour in each image frame of the sequence, in order to more accurately determine contour coordinates for another portion of the contour in each image frame of the sequence that is less well defined.

5. The method of claim 1, wherein the step of developing an initial estimate of the region bounded by the contour of the organ in each image frame of the sequence comprises the step of normalizing the image frames to produce a predefined number of image frames that are spaced apart by substantially equal time intervals during the cycle.

6. The method of claim 1, wherein the parameters are derived from the training data by:

(a) manually defining the contour of the organ in each image frame of the training data for the other individuals, by inspection of the image frames;

(b) assigning a class to each pixel of the image frames in the sequence, based upon whether during the cycle, the pixel is:

(i) always inside the contour;

(ii) always outside the contour;

(iii) transitions from one side of the contour to the other; and if the pixel makes a transition from said one side of the contour to the other, said class being assigned as a function of the image frame in which said transition occurred;

(c) determining a gray scale vector for each pixel of the image frames of the training data during the cycle, for the corresponding organ of the other individuals; and (d) determining a mean vector, a covariance vector, and a class probability as a function of the gray scale vectors and the classes, for each pixel in the image frames of the training data, said mean vector, covariance vector, and class probability for all of the pixels comprising the parameters derived from the training data.

7. The method of claim 1, wherein each of the pixels comprising the image data of the organ for which the contour is being determined have a vector of gray scale values, elements of the vectors varying as the wall of the organ moves, said classes being assigned to each of the pixels based upon the vectors of the gray scale values and the parameters derived from the training data, further comprising the step of converting the class numbers assigned to each pixel into a binary number sequence to indicate pixels that are inside the contour, all other pixels being outside the contour.

8. The method of claim 1, further comprising the steps of removing noise from the image data before developing the initial estimate of the region bounded by the contour by processing the image data with morphological closing and opening operators.

9. The method of claim 1, wherein the boundary motion data are used to estimate structuring elements to determine motion constraints, said motion constraints establishing limits for movement of the contour between any pair of image frames, based upon the maximum movement of the contour between corresponding successive training image frames of the training data, for each of the corresponding organs of the other individuals.

10. The method of claim 9, further comprising the step of iteratively updating the initial estimate of the region bounded by the contour within the limits of movement at a plurality of points around the contour for each of the image frames.

11. A method for determining the contour of a chamber in an in vivo heart, based on image data of the heart that include a plurality of image frames made during at least one cardiac cycle of the heart, said plurality of image frames including a region of interest in which the chamber is disposed and being recorded at substantially equally spaced intervals of time during the cardiac cycle, each image frame comprising a plurality of pixels, and each pixel having a gray, scale value associated with it, said method comprising the steps of:

(a) classifying the pixels in each image frame of the in vivo heart to determine an initial estimate of a region bounded by the contour using training data derived by manually determining contours of corresponding chambers in a plurality of other hearts, thereby indicating whether the pixels in the image frames for the in vivo heart are more likely to be inside the contour or more likely to be outside the contour of the chamber, as a function of a probability, the probability being dependent upon the gray scale values for the pixels in successive image frames in relation to the training data; and (b) refining the initial estimate of the region bounded by the contour of the chamber of the in vivo heart by applying motion constraints to a plurality of spaced-apart points around said contour, for successive image frames, said motion constraints determining limits for movement of each point on the contour, between successive image frames.

12. The method of claim 11, comprising the step of further refining the region bounded by the contour of the chamber determined in step (b), by using global shape constraints to process coordinates of a portion of said contour that is defined with greater certainty, in order to determine coordinates for another portion of said contour that is defined with less certainty, said global shape constraints being based on the training data.

13. The method of claim 12, wherein the step of refining the initial estimate comprises the steps of determining boundary motion data for contours of the other hearts; and estimating structuring elements describing the motion constraints based upon the boundary motion data, for each of the training image frames during one cardiac cycle.

14. The method of claim 11, further comprising the step of testing the contour of the chamber of the in vivo heart thus determined for consistency, based upon a comparison of the contour to constraints determined from the training data, said constraints being based upon the manual determination of the contours of the corresponding chambers for the other hearts.

15. The method of claim 11, wherein the parameters are derived from the training data by:

(a) producing a plurality of training image frames over at least one cardiac cycle for each of the other hearts, the training image frames each comprising a plurality of pixels, each pixel being disposed at a row and a column in the training image frames and having an associated vector of gray scale values;

(b) manually determining the contour of the chamber for each of the other hearts in each of the training image frames;

(c) assigning a class to each pixel in the training image frames for each of the other hearts, said class being determined over one cardiac cycle, based upon whether:

(i) the pixels in the training image frames remained inside the contour that was manually determined throughout said cardiac cycle; or (ii) the pixels in the training image frames remained outside the contour that was manually determined throughout said cardiac cycle of the other heart; or (iii) the pixel position was disposed on one side of the contour that was manually determined, during part of said cardiac cycle, and was disposed on another side of the contour during a remaining part of the cardiac cycle, and if so, based upon the training image frame in which a change in the disposition of the pixels relative to the contour occurred.

16. The method of claim 15, further comprising the step of assigning a mean, a covariance, and a class probability to pixels of the same class in the training image frames, based on the vector of gray scale values of each pixel and the class assigned to that pixel, said mean, covariance, and class probability comprising a priori information that is derived from the training data.

17. The method of claim 11, wherein the step of refining the initial estimate comprises the steps of determining boundary motion data for contours of the corresponding chamber of the other hearts; and estimating structuring elements describing the motion constraints, based upon the boundary motion data for each of the training image frames during one cardiac cycle.

18. The method of claim 11, wherein the chamber of the in vivo heart is a left ventricle and wherein the image frames are made over a systole portion and a diastole portion of the cardiac cycle, the systole portion and the diastole portion being processed separately to determine the contour of the chamber of the in vivo heart.

19. The method of claim 18, further comprising the step of determining an end systole image frame for the in vivo heart, using a classifier that employs histograms of the gray scale values of the pixels.

20. A method for diagnostically analyzing and evaluating physiological functions of an in vivo organ, based upon contours of the organ that are determined automatically at different times, comprising the steps of:

(a) producing digital image data representing a sequence of image frames of a region in which the organ is disposed, each image frame of said sequence of image frames comprising a plurality of pixels and said sequence of image frames being made over an interval of time during which the organ has completed at least one cycle of a cyclical activity that it undergoes as part of a physiological function of the organ;

(b) using training data derived from imaging a plurality of other corresponding organs and manually determining contours for each of the corresponding organs, automatically determining a contour of the in vivo organ in the plurality of image frames during at least one cardiac cycle; and (c) by comparing changes in position of the contour that was automatically determined in sequential image frames, evaluating the physiological function of the organ to detect abnormalities in motion indicative of disease or malfunction.

21. The method of claim 20, wherein the organ comprises a left ventricle of a heart, and wherein the step of evaluating comprises the step of determining if a mitral valve is leaking as a function of a change in an area within the contour during a plurality of cardiac cycles.

22. The method of claim 20, wherein the organ comprises a left ventricle of a heart having a myocardium muscle that defines a portion of the contour of the left ventricle, and wherein the step of evaluating comprises the step of determining if a portion of the myocardium muscle has been weakened by comparing a range of motion for different portions of the contour over the sequence of image frames during a cardiac cycle, a substantially reduced range of movement occurring at any portion of the contour where the myocardium muscle is weakened.

* * * * *